United States Patent
Fric et al.

(10) Patent No.: US 8,096,761 B2
(45) Date of Patent: Jan. 17, 2012

(54) BLADE PITCH MANAGEMENT METHOD AND SYSTEM

(75) Inventors: Thomas Frank Fric, Greer, SC (US); Kevin Standish, Simpsonville, SC (US); Kirk Gee Pierce, Simpsonville, SC (US); Bernard Landa, Taylors, SC (US)

(73) Assignee: General Electric Company, Schenectady, NY (US)

( * ) Notice: Subject to any disclaimer, the term of this patent is extended or adjusted under 35 U.S.C. 154(b) by 336 days.

(21) Appl. No.: 12/252,890

(22) Filed: Oct. 16, 2008

(65) Prior Publication Data

US 2010/0098540 A1    Apr. 22, 2010

(51) Int. Cl.
*F03D 7/04* (2006.01)

(52) U.S. Cl. .............. 416/1; 416/37; 416/39; 416/41

(58) Field of Classification Search .......... 416/1, 132 B, 416/37, 39, 41; 415/4.1, 4.3, 4.5; 290/44, 290/55
See application file for complete search history.

(56) References Cited

U.S. PATENT DOCUMENTS

| | | | |
|---|---|---|---|
| 4,160,170 A * | 7/1979 | Harner et al. | 290/44 |
| 4,348,155 A | 9/1982 | Barnes et al. | |
| 4,352,634 A | 10/1982 | Andrews | |
| 5,527,151 A | 6/1996 | Coleman et al. | |
| 6,612,810 B1 | 9/2003 | Olsen et al. | |
| 6,837,681 B2 * | 1/2005 | Wobben | 416/1 |
| 6,890,152 B1 | 5/2005 | Thisted | |
| 7,059,833 B2 | 6/2006 | Stiesdal et al. | |
| 7,086,834 B2 * | 8/2006 | LeMieux | 416/1 |
| 7,101,152 B2 * | 9/2006 | Wobben | 416/1 |
| 7,182,575 B2 * | 2/2007 | Grabau | 416/1 |
| 7,263,984 B2 | 9/2007 | Wade et al. | |
| 7,303,373 B2 | 12/2007 | Viertl | |
| 7,352,076 B1 | 4/2008 | Gabrys | |
| 7,484,933 B2 * | 2/2009 | Wobben | 416/1 |
| 2002/0000723 A1 * | 1/2002 | Weitkamp | 290/44 |
| 2002/0114692 A1 * | 8/2002 | Boughton | 415/4.5 |
| 2003/0099546 A1 | 5/2003 | Stiesdal et al. | |
| 2005/0019163 A1 * | 1/2005 | Heronemus | 416/44 |
| 2006/0002797 A1 * | 1/2006 | Moroz et al. | 416/98 |

(Continued)

FOREIGN PATENT DOCUMENTS

EP    0914276 B1    7/1997

(Continued)

OTHER PUBLICATIONS

"Ice Detection and Heated Blades/Operating ENERCON Wind Turbines in Winter", WIND BLATT, Jun. 2003, 2 Pages.

*Primary Examiner* — Edward Look
*Assistant Examiner* — Aaron R Eastman
(74) *Attorney, Agent, or Firm* — McNees Wallace & Nurick LLC

(57) ABSTRACT

A method for operating a wind turbine. The method includes providing a wind turbine having at least one blade having adjustable pitch angle that is adjusted according to an operational parameter schedule. A blade efficiency parameter is determined in response to a wind speed and a rotor speed. A minimum pitch angle is determined in response to the blade efficiency parameter and the pitch angle of the at least one blade in response to the blade efficiency parameter is maintained to an angle equal to or greater than the minimum pitch angle independent of the operational parameter schedule. A wind turbine plant and a method for servicing a wind turbine are also disclosed.

12 Claims, 5 Drawing Sheets

U.S. PATENT DOCUMENTS

| | | |
|---|---|---|
| 2006/0119106 A9* | 6/2006 | Borden et al. .................. 290/44 |
| 2006/0216148 A1* | 9/2006 | Wobben ............................ 416/1 |
| 2006/0273595 A1* | 12/2006 | Avagliano et al. ............. 290/44 |
| 2007/0138797 A1* | 6/2007 | Reidy et al. ..................... 290/44 |
| 2007/0154310 A1* | 7/2007 | Wobben ............................ 416/1 |
| 2008/0317583 A1* | 12/2008 | Grabau ........................ 415/4.3 |
| 2009/0246019 A1* | 10/2009 | Volanthen et al. ................ 416/1 |
| 2010/0021296 A1* | 1/2010 | Nielsen ............................ 416/1 |
| 2010/0135787 A1* | 6/2010 | Scholte-Wassink ............. 416/1 |
| 2010/0143121 A1* | 6/2010 | Haans et al. ..................... 416/1 |
| 2010/0143127 A1* | 6/2010 | Ahmann ........................ 416/61 |

FOREIGN PATENT DOCUMENTS

| | | |
|---|---|---|
| JP | 2005240725 A | 9/2005 |
| WO | 2004104412 | 12/2004 |
| WO | 2006066591 A1 | 6/2006 |
| WO | 2007114698 A3 | 10/2007 |

* cited by examiner

BLADE PITCH MANAGEMENT METHOD AND SYSTEM

FIELD OF THE INVENTION

The present invention is directed generally to wind turbines, and more particularly to a method for increasing energy capture and controlling blade pitch of a wind turbine blade.

BACKGROUND OF THE INVENTION

Recently, wind turbines have received increased attention as environmentally safe and relatively inexpensive alternative energy sources. With this growing interest, considerable efforts have been made to develop wind turbines that are reliable and efficient.

Generally, a wind turbine includes a rotor having multiple blades. The rotor is mounted to a housing or nacelle, which is positioned on top of a truss or tubular tower. Utility grade wind turbines (i.e., wind turbines designed to provide electrical power to a utility grid) can have large rotors (e.g., 30 or more meters in length). In addition, the wind turbines are typically mounted on towers that are at least 60 meters in height. Blades on these rotors transform wind energy into a rotational torque or force that drives one or more generators that may be rotationally coupled to the rotor through a gearbox. The gearbox steps up the inherently low rotational speed of the turbine rotor for the generator to efficiently convert mechanical energy to electrical energy, which is fed into a utility grid.

Wind turbine blades have continually increased in size in order to increase energy capture. However, as blades have increased in size, it has become increasingly more difficult to control optimum energy capture. The blade loading is dependent on the wind speed, tip speed ratio (TSR) and/or pitch setting of the blade. TSR is the ratio of the rotational velocity of the blade tip to wind speed. It is important to optimize the operation of the wind turbine, including blade energy capture, to reduce the cost of the energy produced. Pitch setting of the blades (i.e., the angle of attack of the airfoil shaped blade), provides one of the parameters utilized in wind turbine control. Typically, controllers are configured to adjust rotor speed (i.e., the rotational speed of the hub around which the blades rotate) by adjusting the blade pitch in a manner that provides increased or decreased energy transfer from the wind, which accordingly is expected to adjust the rotor speed.

Wind turbines with sophisticated control systems maintain constant speed and power by active blade pitch control. Power production for a wind turbine is negatively impacted if the blades of the wind turbine operate in a non-optimal state. A common weather event that causes sub-optimal performance of the machine is blade icing in which appreciable amounts of ice collect on the leading edge or the upwind pressure surface. Ice build-up on the wind turbine blades reduce the efficiency of energy transfer from the wind and may ultimately result in aerodynamic stall from separation in airflow over the surface of the wing. In addition to icing, other forms of blade fouling may occur. For example, debris or insects may accumulate on the blades and reduce the aerodynamic efficiency of the blades. In addition, low air density or a drop in air density may also result in a loss of energy transfer from the wind to the blades.

Aerodynamic stall causes a decrease in lift and an increase in drag coefficients for a wind turbine blade. The onset of stall is signaled by a sharp change in a wind turbine's performance evident by degradation in output power versus expected power. In the event of aerodynamic stall, the energy transfer from the wind is reduced precipitously. Power degradation resulting from the loss of energy transfer is most significant during periods of rated winds where full power output is anticipated by the controller. That is, the control system interprets the decrease in power as a need for increased rotor torque. The control system reacts by calling for a decrease in blade pitch, which increases the angle of attack in an effort to increase the energy transfer from the wind. Increasing the angle of attack by the control system of an aerodynamically stalled blade further increases the flow separation, increasing the stall condition and further decreasing the energy transfer from the wind. As such, the current systems fail to address conditions, including icing conditions or similar conditions, such as low density air operation, blade fouling, or other blade condition susceptible to aerodynamic stalling.

Therefore, what is needed is a method for operating a wind turbine that optimizes energy capture by controlling the blade pitch angle for a large variety of operating conditions, including icing conditions.

SUMMARY OF THE INVENTION

One aspect of the present disclosure includes a method for operating a wind turbine. The method includes providing a wind turbine having at least one blade having adjustable pitch angle that is adjusted according to an operational parameter schedule. A blade efficiency parameter is determined in response to a wind speed and a rotor speed. A minimum pitch angle is determined in response to the blade efficiency parameter and the pitch angle of the at least one blade in response to the blade efficiency parameter is maintained to an angle equal to or greater than the minimum pitch angle independent of the operational parameter schedule.

Another aspect of the present disclosure includes a wind turbine plant having a wind turbine having at least one blade having adjustable pitch angle that is adjusted according to an operational parameter schedule. The wind turbine includes a controller capable of determining a blade efficiency parameter in response to a wind speed and a rotor speed. The controller determines a minimum pitch angle in response to the blade efficiency parameter and maintains the pitch angle of the at least one blade in response to the blade efficiency parameter to an angle equal to or greater than the minimum pitch angle independent of the operational parameter schedule.

Still another aspect of the present disclosure includes a method for servicing a wind turbine. The method includes providing a wind turbine having a controller and at least one blade having adjustable pitch angle that is adjusted according to an operational parameter schedule. A blade efficiency parameter is determined in response to a wind speed and a rotor speed. The method further includes configuring the controller to maintain the pitch angle of the at least one blade in response to the blade efficiency parameter to an angle equal to or greater than the minimum pitch angle independent of the operational parameter schedule.

An advantage of the present disclosure includes reduction or elimination of aerodynamic stall due to icing, low density air operation, blade fouling, or other blade condition susceptible to aerodynamic stalling.

Another advantage of the present disclosure includes monitoring and diagnosis of operational problems, such as excessive ice buildup or blade geometry degradation.

Another advantage of the present disclosure is that certain embodiments of the method include utilization of existing sensors and equipment, permitting retrofitting of wind turbines and low implemental cost.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
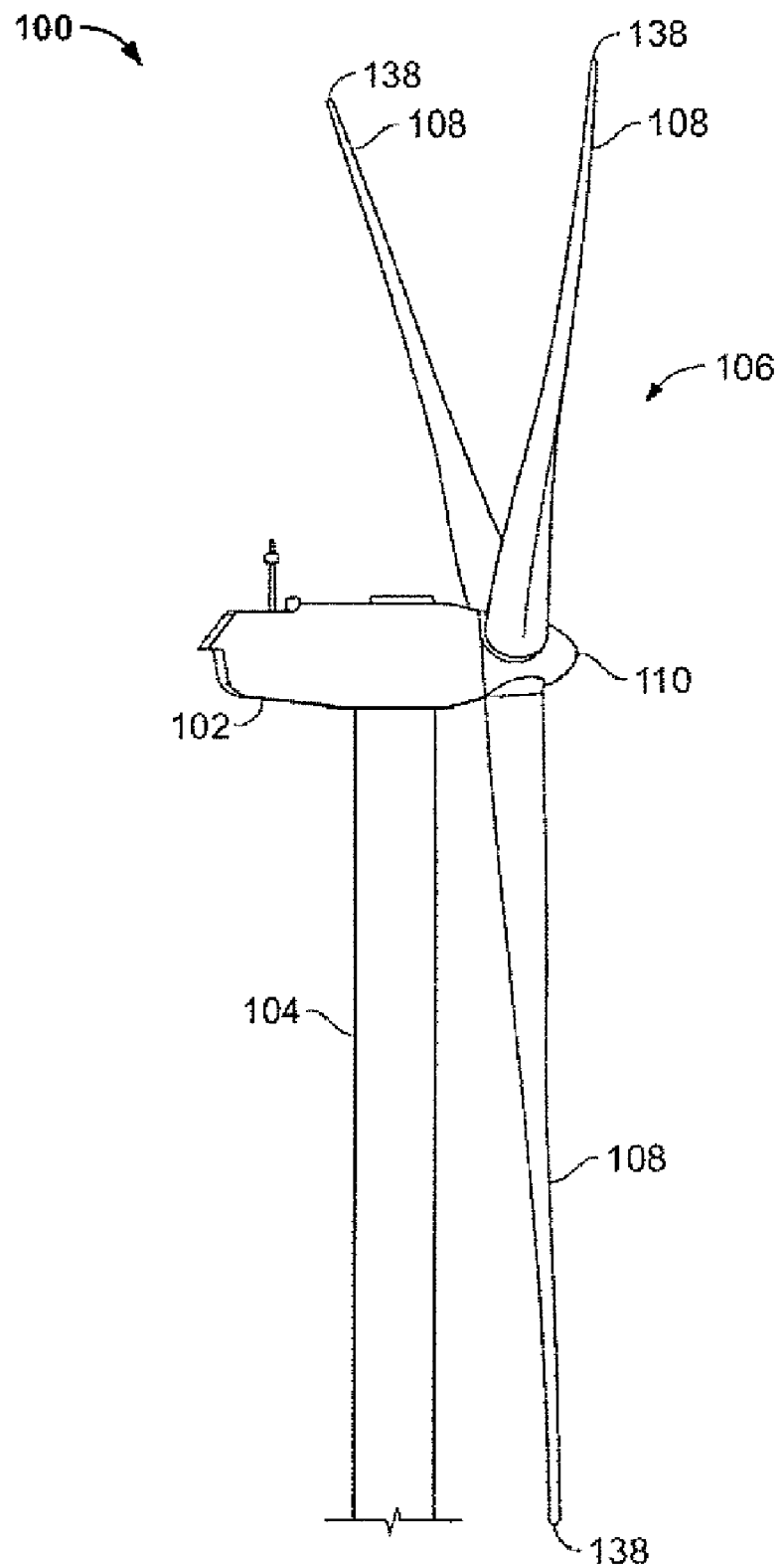
FIG. 1 is an illustration of an exemplary configuration of a wind turbine.

Referring to FIG. 1, an exemplary wind turbine 100 according to the present invention is disclosed. The wind turbine 100 includes a nacelle 102 mounted atop a tall tower 104, only a portion of which is shown in FIG. 1. Wind turbine 100 also comprises a wind turbine rotor 106 that includes one or more rotor blades 108 attached to a rotating hub 110. The blade tips 138 are disposed at one end of each of the rotor blades 108. Although wind turbine 100 illustrated in FIG. 1 includes three rotor blades 108, there are no specific limits on the number of rotor blades 108 required by the present invention. The height of tower 104 is selected based upon factors and conditions known in the art.

Figure 2:
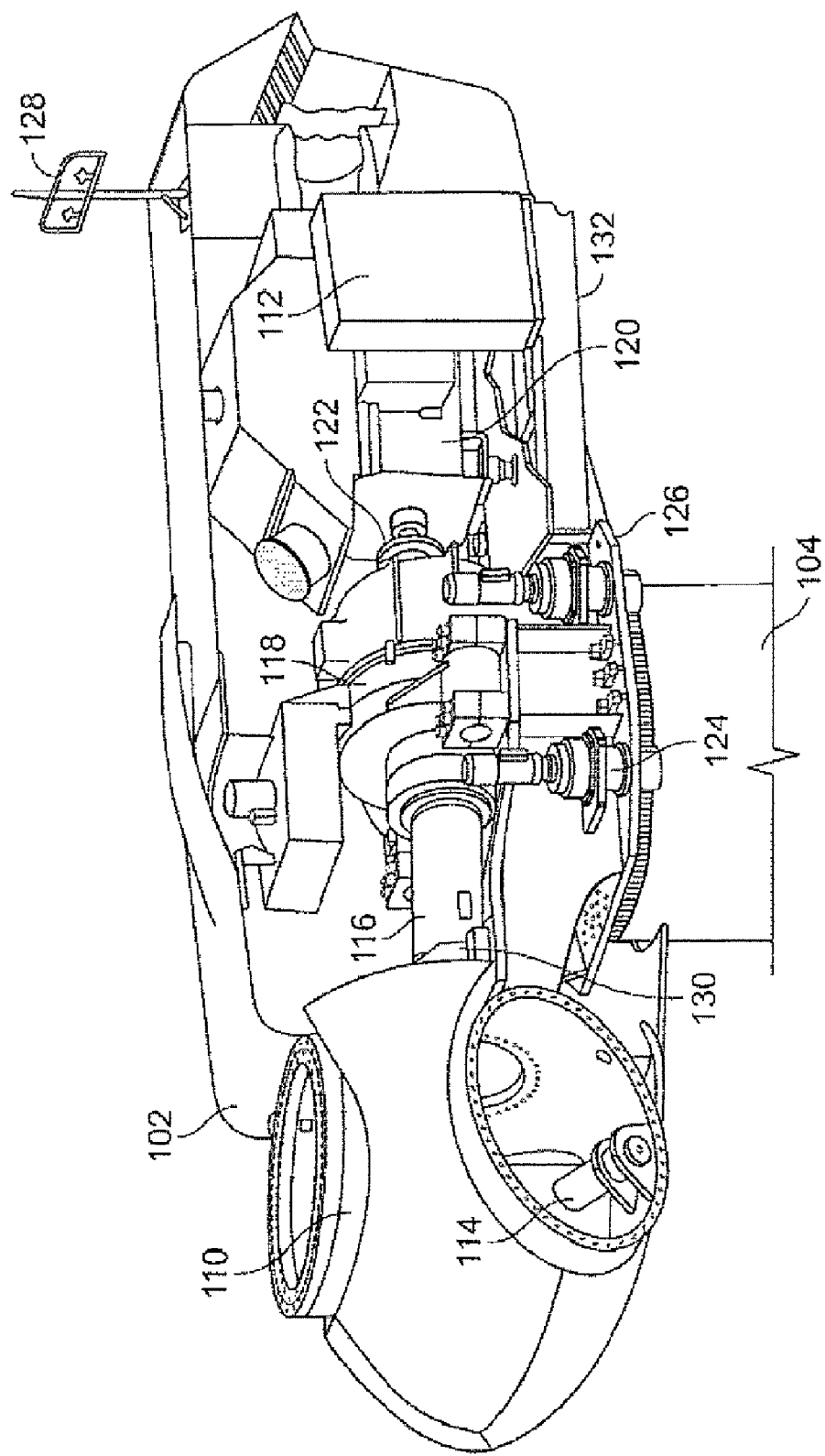
FIG. 2 is a cut-away perspective view of a nacelle of the exemplary wind turbine configuration shown in FIG. 1.

In some configurations and referring to FIG. 2, various components are housed in nacelle 102 atop tower 104. One or more microcontrollers or other control components (not shown) are housed within control panel 112. The microcontrollers include hardware and software configured to provide a control system providing overall system monitoring and control, including pitch and speed regulation, high-speed shaft and yaw brake application, yaw and pump motor application and fault monitoring. In alternative embodiments of the disclosure, the control system may be a distributed control architecture not solely provided for by the control panel 112 as would be appreciated by one of ordinary skill in the art. The control system provides control signals to a variable blade pitch drive 114 to control the pitch of blades 108 (FIG. 1) that drive hub 110 as a result of wind. In some configurations, the pitches of blades 108 are individually controlled by blade pitch drive 114.

The drive train of the wind turbine includes a main rotor shaft 116 (also referred to as a "low speed shaft") connected to hub 110 and supported by a main bearing 130 and, at an opposite end of shaft 116, to a gear box 118. The speed of rotation of the main rotor shaft 116 or rotor speed may be measured by suitable instrumentation or measurement devices (not shown). In some configurations, hub rotational speed is known from an encoder on a high speed shaft connected to the aft end of the generator, and blade length, which is known, is used to determine tip speed. In addition, the rotor speed may be determined from a proximity switch on the high or low speed shaft. In addition, the rotor speed may be directly measured with sensing devices, such as optical strobing detection of a labeled high or low speed shaft. The rotor speed information may be provided to the control system to provide inputs for determination of a tip speed ratio. Gear box 118, in some configurations, utilizes a dual path geometry to drive an enclosed high speed shaft. The high speed shaft (not shown in FIG. 2) is used to drive generator 120, which is mounted on main frame 132. In some configurations, rotor torque is transmitted via coupling 122. Generator 120 may be of any suitable type, for example, a wound rotor induction generator.

Yaw drive 124 and yaw deck 126 provide a yaw orientation system for wind turbine 100. Anemometry provides information for the yaw orientation system, including measured instantaneous wind direction and wind speed at the wind turbine. Anemometry may be provided by a wind vane 128. The anemometry information may be provided to the control system to provide inputs for determination of a tip speed ratio. In some configurations, the yaw system is mounted on a flange provided atop tower 104.

Figure 3:
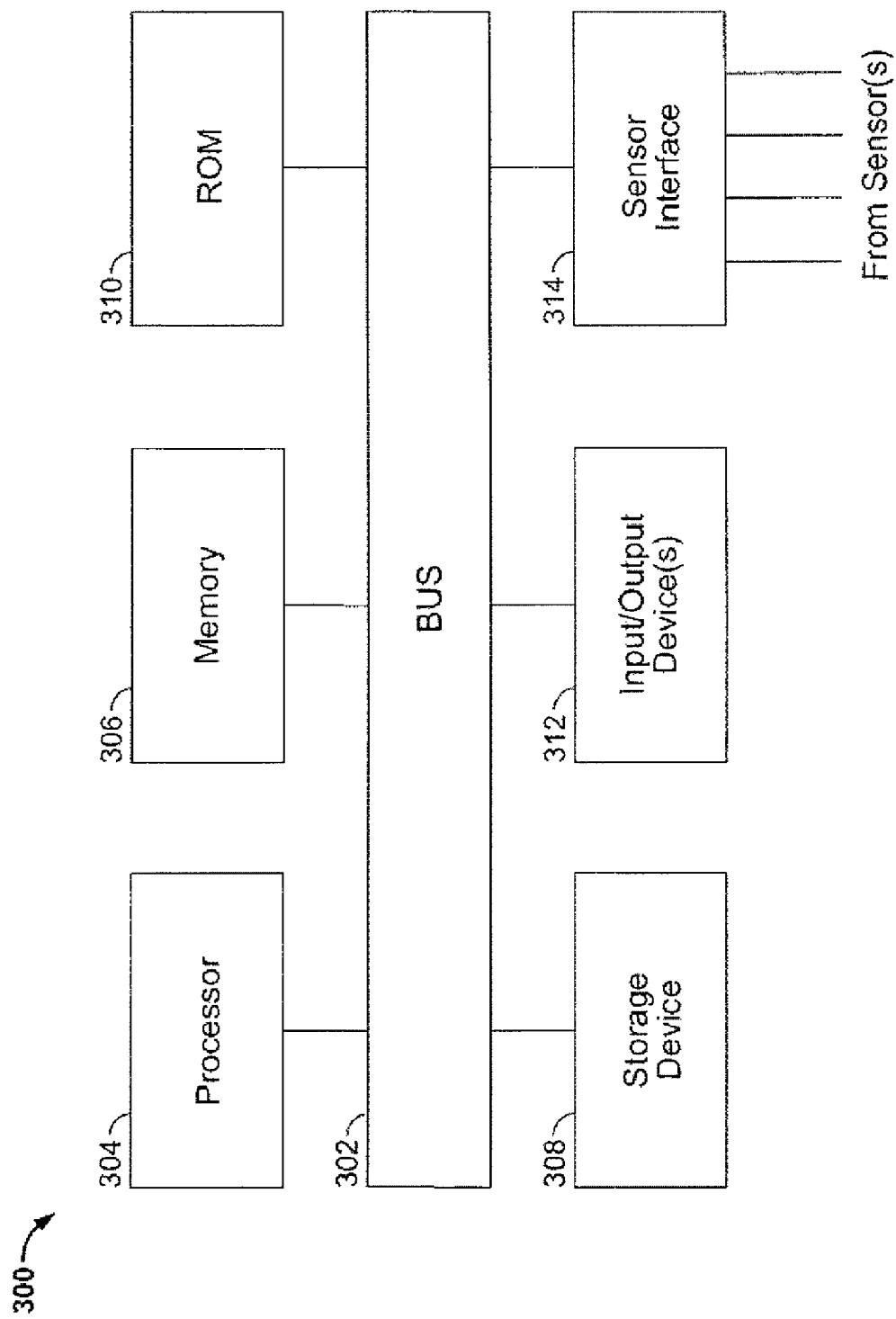
FIG. 3 is a block diagram of an exemplary configuration of a control system for the wind turbine configuration shown in FIG. 1.

In some configurations and referring to FIG. 3, an exemplary control system 300 for wind turbine 100 includes a bus 302 or other communications device to communicate information. Processor(s) 304 are coupled to bus 302 to process information, including information from sensors configured to measure displacements or moments. Control system 300 further includes random access memory (RAM) 306 and/or other storage device(s) 308. RAM 306 and storage device(s) 308 are coupled to bus 302 to store and transfer information and instructions to be executed by processor(s) 304. RAM 306 (and also storage device(s) 308, if required) can also be used to store temporary variables or other intermediate information during execution of instructions by processor(s) 304. Control system 300 can also include read only memory (ROM) and or other static storage device 310, which is coupled to bus 302 to store and provide static (i.e., non-changing) information and instructions to processor(s) 304. Input/output device(s) 312 can include any device known in the art to provide input data to control system 300 and to provide yaw control and pitch control outputs. Instructions are provided to memory from a storage device, such as magnetic disk, a read-only memory (ROM) integrated circuit, CD-ROM, DVD, via a remote connection that is either wired or wireless providing access to one or more electronically-accessible media, etc. In some embodiments, hard-wired circuitry can be used in place of or in combination with software instructions. Thus, execution of sequences of instructions is not limited to any specific combination of hardware circuitry and software instructions. Sensor interface 314 is an interface that allows control system 300 to communicate with one or more sensors. Sensor interface 314 can be or can comprise, for example, one or more analog-to-digital converters that convert analog signals into digital signals that can be used by processor(s) 304. In one embodiment, the sensor interface includes signals from a rotor speed determining device and anemometry from wind vane 128.

Figure 4:
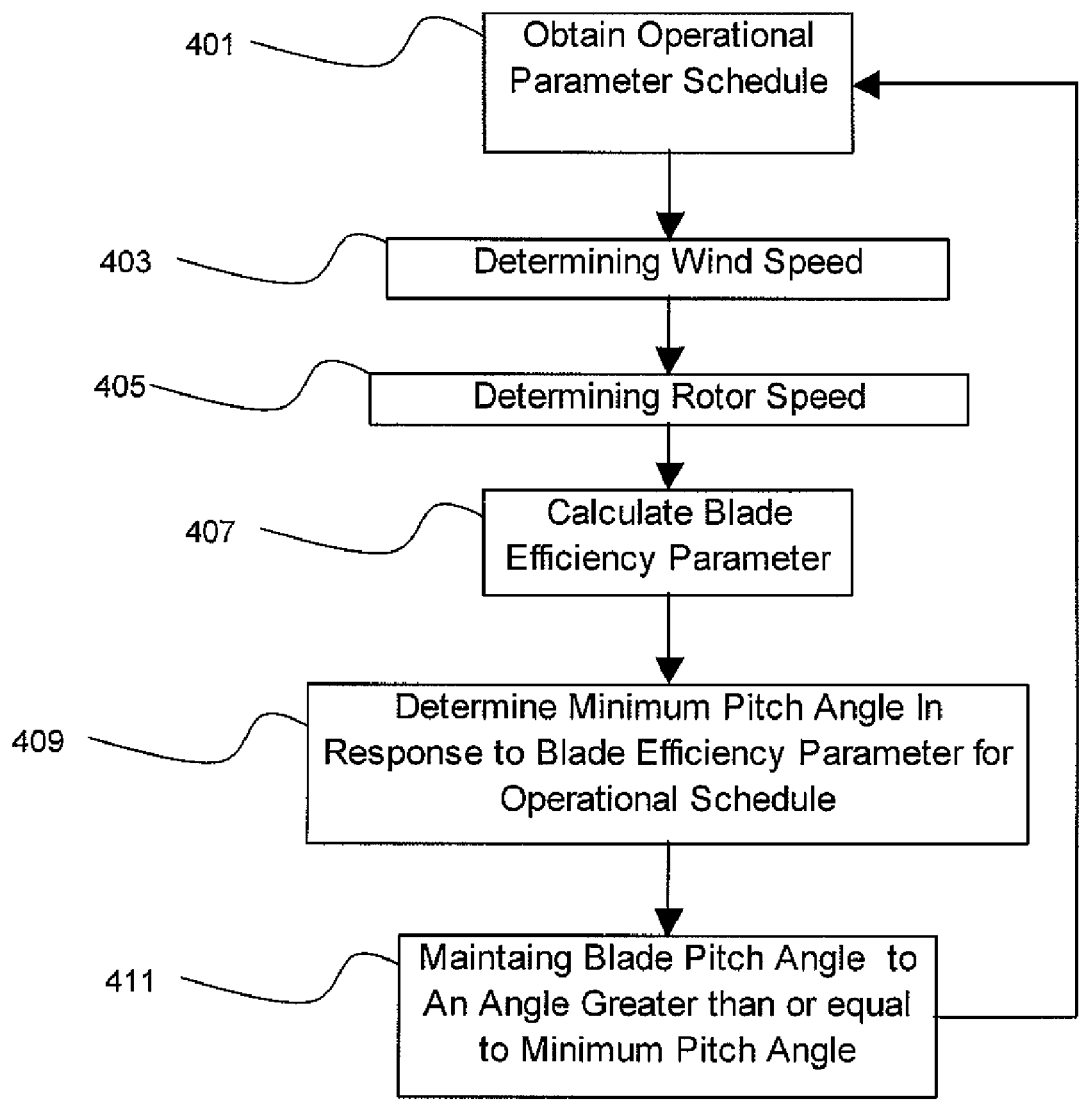
FIG. 4 is a process flow diagram of an exemplary method according to an embodiment of the present disclosure.

A method for operating a wind turbine 100 is illustrated in the process flow diagram shown in FIG. 4. In order to provide the control of the present disclosure, an operational parameter schedule is determined, step 401. The operational parameter schedule may be a data curve or similar control algorithm utilized by the control system or controller to provide desired wind turbine operation. For example, the operational parameter schedule may include a power curve or an expected rated power value for a given pitch angle and tip speed ratio. The expected rated power value is a value that is provided based upon the particular configuration and design parameters of a particular wind turbine or wind turbine design. The expected rated power value or power curve is a well-known operational input upon which control systems may control the various systems of the wind turbine. However, the present disclosure is not so limited. For example, in addition, other operational inputs, such as the coefficient of torque or other coefficient may be utilized as the operation input. For example, the control system may adjust one or both of the generator torque or blade pitch in response to a change in operational parameters, such as tip speed ratio. Once the operational parameter curve is determined, wind speed is determined, step 403, at wind vane 128 or at another suitable device and rotor speed is determined, step 405, by any suitable method or by any suitable device. In other embodiments, the wind speed is calculated from other measured values or models. While the above has been described as determining the wind speed and the rotor speed directly from the corresponding systems or instruments, the wind speed and rotor speed may be provided from other locations or systems, such as weather monitoring stations, weather predicators, from a wind plant central monitoring/control, from predicted weather conditions, from externally mounted monitoring devices, from instruments mounted on other areas of the wind turbine or elsewhere in the wind turbine plant, such as directly on the blades, or by other methods or systems suitable for providing wind speed and/or rotor speed and/or other parameters suitable for calculating tip speed ratios. The wind speed and rotor speed are utilized to calculate a blade efficiency parameter, step 407. The blade efficiency parameter may be calculated by any suitable formula or technique. In one embodiment, the blade efficiency parameter is a tip speed ratio calculated dividing the speed of the blade tips 138 of the turbine blade by the speed of the wind:

$$TSR = \frac{\Omega_R}{V_{wind}}$$

wherein TSR is tip speed ratio, $\Omega_R$ is the velocity of the blade tips 138 and the $V_{wind}$ is wind speed. $\Omega_R$ may be calculated from the rotor speed and the length of the blade or may be measured directly via accelerometers or similar devices mounted on blades 108.

This blade efficiency parameter data is received by control system 300 or controller, which utilizes a corresponding table, equation or other relationship that relates blade efficiency parameter to a blade pitch at a predetermined value of operational parameter. A minimum blade pitch angle is determined, step 409. The equation or table for the determination of the minimum blade pitch angle can be empirically determined or calculated using known physical laws. For example, a power curve having values of $C_p$ having an operationally desirable relationship between tip speed ratio and blade pitch angle may be utilized as the minimum blade pitch angle. In response, the control system 300 adjusts (or maintains) the pitch angle of blades 108 to a value greater than the minimum blade pitch angle, step 411.

Operation of the blade pitch angle at angles at or above the minimum blade pitch determined in step 409 provides operation that reduces or eliminates aerodynamic stall conditions resulting from icing, low density air operation, blade fouling, or other blade condition susceptible to aerodynamic stalling. A desirable aerodynamic wind turbine blade design yields the coefficients for power and torque and therefore aerodynamic efficiency for the designed tip speed ratio. This designed aerodynamic efficiency can be evaluated, for example, by measuring tip speed ratio with temperature and density compensated wind speed and coefficient of power. In this embodiment, normalized and filtered readings of the calculated aerodynamic efficiency may be taken and recorded to provide a record, such as an aerodynamic performance history, which may be utilized in the controller of the wind turbine. This record may be periodically evaluated against the designed values over time intervals and can lead to predictive and preventive maintenance tasks of the wind turbine. For example, the record may permit the scheduling of servicing or other actions, such as clearing the blades of insects, or refurbishing the blades. Such maintenance activities and scheduling permit prolonged and improved wind turbine operation.

In another embodiment, the above method may be discontinuous, wherein the operation of the wind turbine with the minimum blade pitch angle may be activated when desired or fouled blades, icing, debris buildup or other degraded blade aerodynamics are suspected.

In addition to providing reducing of elimination of the stall conditions, the time of operation of the wind turbine at a minimum value may be used for diagnostics for the wind turbine, to detect non-preferred operating conditions or operational deviations. For example, an extended period of operation at the minimum value of blade pitch angle may indicated the presence of icing. In addition, other supporting data inputs, such as temperature or weather information may provide ice detection, which may permit the activation of deicing systems or potential shutdown or maintenance of the wind turbine.

Example

Figure 5:
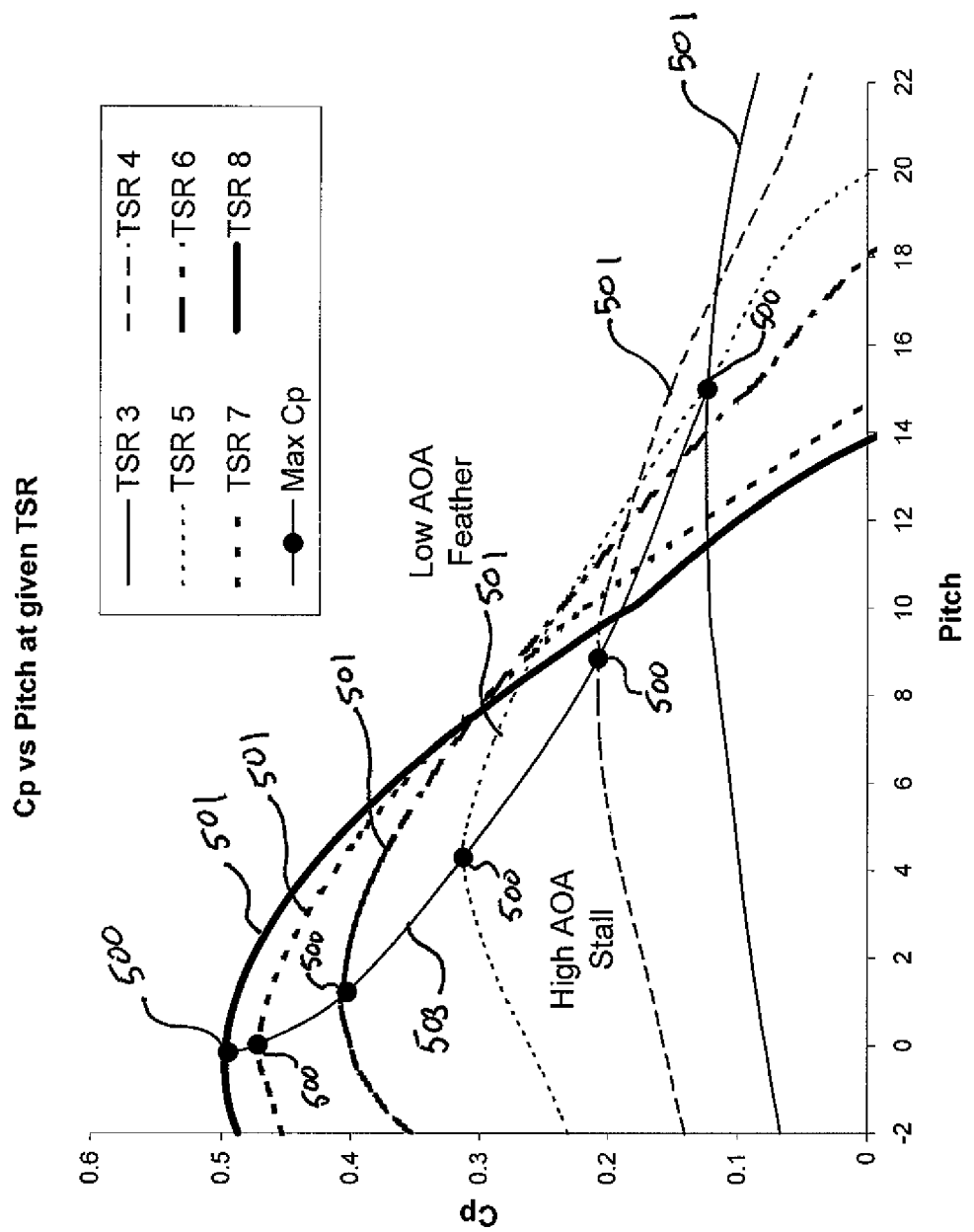
FIG. 5 shows a graphical representation of minimum pitch angles as a function of tip speed ratio (TSR).

FIG. 5 shows a graphical representation of a minimum pitch angle curve shown at the maximum $C_p$ as a pitch angle according to an exemplary wind turbine control scheme. As shown in FIG. 5, in this example, the maximum power ($C_p$) point 500 along power curves 501 corresponding to the various tip speed ratios (i.e., tip speed ratios of 3.0, 4.0, 5.0, 6.0, 7.0, and 8.0, corresponding to TSR 3, TSR 4, TSR 5, TSR 6, TSR, 7 and TSR 8, respectively). These maximum power points 500 equal the minimum pitch angle setting for the wind turbine control according to embodiments of the disclosure. The maximum power points 500 are plotted to form a minimum pitch angle curve 503. As shown, the minimum pitch angle curve 503 provides wind turbine control such that operation on the left side region of the curve (i.e., "High AOA Stall" region), includes a high angle of attack blade and potential approach to stall, wherein the method of the present invention requires that the wind turbine maintain (and is constrained to) a minimum pitch angle corresponding to the pitch angle along the minimum pitch angle curve 503. Conversely, operation on the right side region of the curve (i.e. "Low AOA Feather") represents a low angle of attack for the blade, wherein the wind turbine would operate with pitch angles on or to the right of or greater than the minimum pitch angle curve 503.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for operating a wind turbine during degraded blade aerodynamic conditions comprising:
   providing a wind turbine having at least one blade having adjustable pitch angle that is adjusted according to an operational parameter schedule, the operational parameter schedule including a control algorithm or a coefficient of power curve;
   regulating the wind turbine through a control scheme in response to a degraded blade aerodynamic condition, the control scheme comprising:
   determining a wind speed and rotor speed;
   calculating a blade efficiency parameter in response to the wind speed and the rotor speed;
   determining a minimum pitch angle in response to the blade efficiency parameter, wherein the minimum pitch angle is determined by relating the blade efficiency parameter to a blade pitch at a predetermined value of the operational parameter;
   maintaining the pitch angle of the at least one blade in response to the blade efficiency parameter at an angle equal to or greater than the determined minimum pitch angle, wherein maintaining the pitch angle of the at least one blade is independent of the operational parameter schedule, wherein maintaining the pitch angle is configured to reduce or substantially eliminate aerodynamic stall during the degraded blade aerodynamic condition; and
   departing from the control scheme when the degraded blade aerodynamic condition is no longer detected.

2. The method of claim 1, wherein the blade efficiency parameter is selected from the group consisting of tip speed ratio, blade aerodynamic efficiency and combinations thereof.

3. The method of claim 1, further comprising determining the presence or absence of a fouled blade condition in response to a preselected time at which the pitch angle is equal to the minimum pitch angle.

4. The method of claim 1, further comprising initiating servicing of the blades in response to a detected fouled blade condition.

5. A wind turbine plant comprising:
   a wind turbine having at least one blade having adjustable pitch angle that is adjusted according to an operational parameter schedule, the operational parameter schedule including a control algorithm or a coefficient of power curve;
   a controller capable of determining a blade efficiency parameter in response to a wind speed and a rotor speed;
   wherein the controller utilizes a control scheme in response to a degraded blade aerodynamic condition, the controller determines a minimum pitch angle in response to the blade efficiency parameter, wherein the minimum pitch angle is determined by relating the blade efficiency parameter to a blade pitch at a predetermined value of the operational parameter, and the controller maintains the pitch angle of the at least one blade in response to the blade efficiency parameter at an angle equal to or greater than the determined minimum pitch angle, wherein maintaining the pitch angle of the at least one blade is independent of the operational parameter schedule, wherein maintaining the pitch angle is configured to reduce or substantially eliminate aerodynamic stall during the degraded blade aerodynamic condition and wherein the controller departs from the control scheme when the degraded blade aerodynamic condition is no longer detected.

6. The wind turbine plant of claim 5, wherein the plant comprises a plurality of wind turbines.

7. The wind turbine plant of claim 5, wherein the controller is capable of determining the presence or absence of a fouled blade condition in response to a preselected time at which the pitch angle is equal to the minimum pitch angle.

8. A method for servicing a wind turbine comprising:
   providing a wind turbine having a controller and at least one blade having adjustable pitch angle that is adjusted according to an operational parameter schedule, the operational parameter schedule including a control algorithm or a coefficient of power curve;
   regulating the wind turbine through a control scheme in response to a degraded blade aerodynamic condition, the control scheme comprising:
   determining a wind speed and a rotor speed;
   calculating a blade efficiency parameter in response to the wind speed and the rotor speed;
   determining a minimum pitch angle in response to the blade efficiency parameter, wherein the minimum pitch angle is determined by relating the blade efficiency parameter to a blade pitch at a predetermined value of the operational parameter;
   configuring the controller to maintain the pitch angle of the at least one blade in response to the blade efficiency parameter at an angle equal to or greater than the minimum pitch angle independent of the operational parameter schedule, wherein maintaining the pitch angle is configured to reduce or substantially eliminate aerodynamic stall during the degraded blade aerodynamic condition; and
   departing from the control scheme when the degraded blade aerodynamic condition is no longer detected.

9. The method of claim 8, wherein the operational parameter schedule is selected from a coefficient of power curve.

10. The method of claim 8, wherein the blade efficiency parameter is selected from the group consisting of tip speed ratio, blade aerodynamic efficiency and combinations thereof.

11. The method of claim 8, further comprising determining the presence or absence of a fouled blade condition in response to a preselected time at which the pitch angle is equal to the minimum pitch angle.

12. The method of claim 8, further comprising initiating servicing of the blades in response to a detected fouled blade condition.

* * * * *